Aug. 9, 1932.    J. GUILMETTE    1,871,052
DIFFERENTIAL
Filed Oct. 9, 1930    2 Sheets-Sheet 1
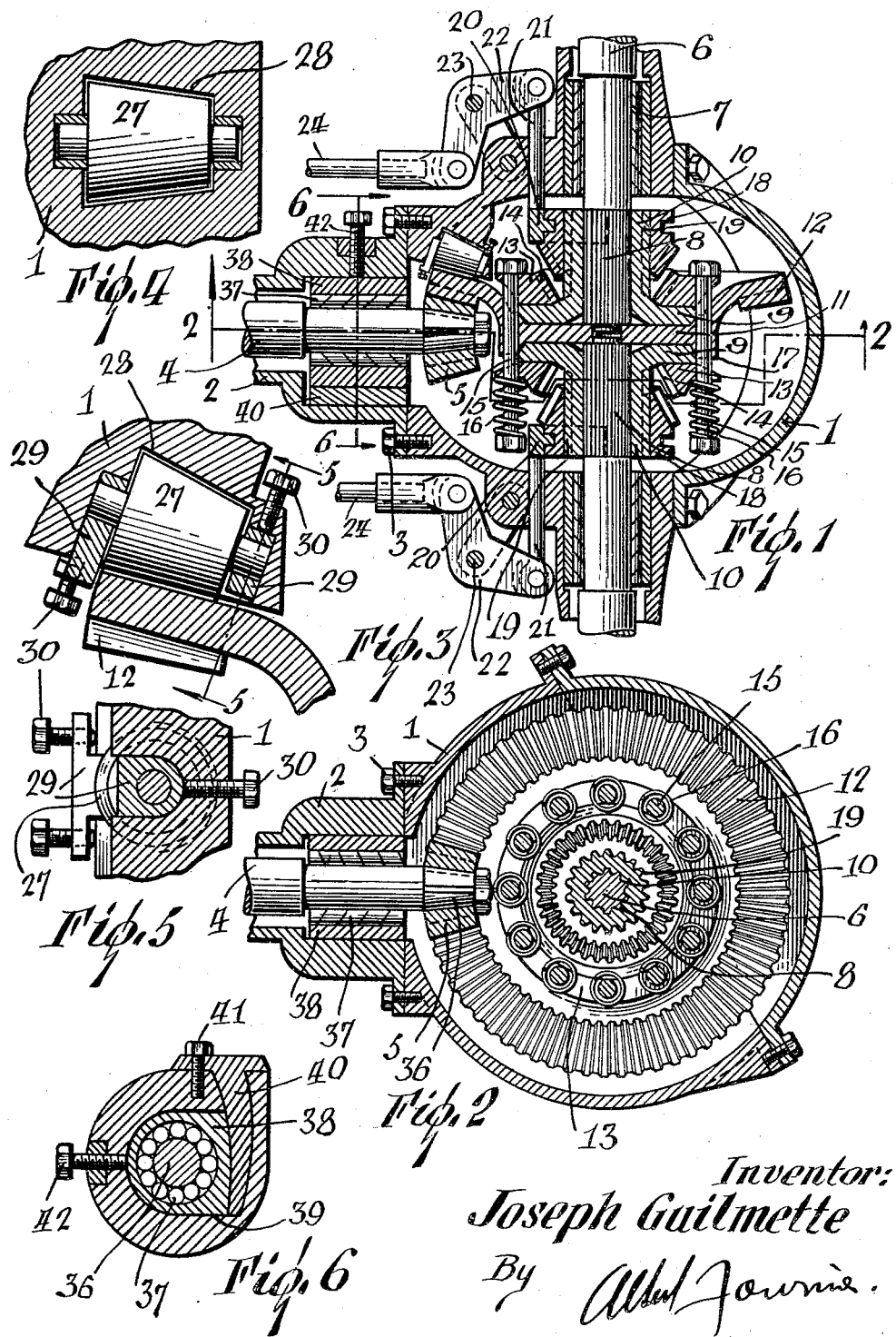
Inventor:
Joseph Guilmette
By Albert Journie.
Attorney

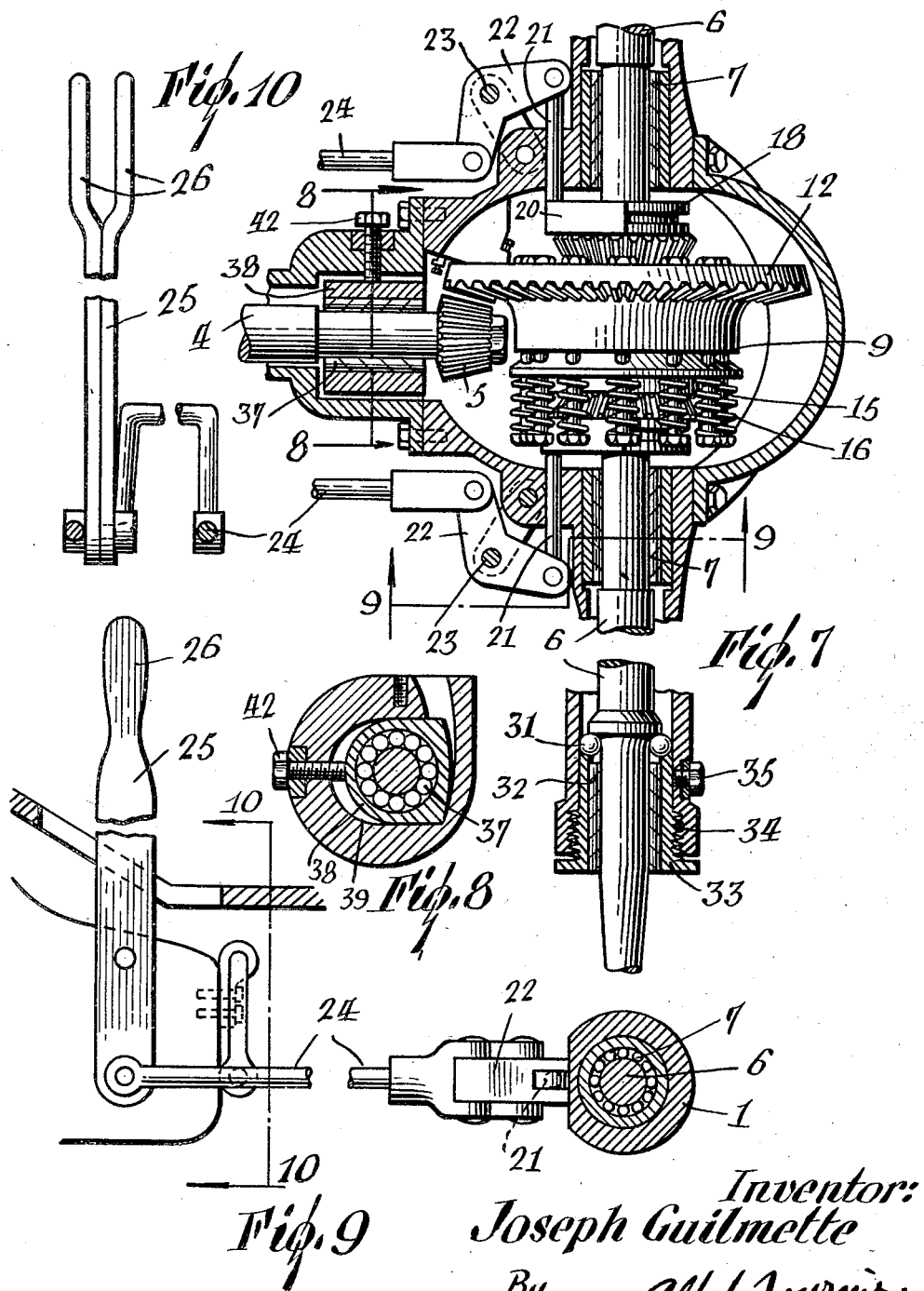

Patented Aug. 9, 1932

1,871,052

UNITED STATES PATENT OFFICE

JOSEPH GUILMETTE, OF ST. FELICIEN, QUEBEC, CANADA

DIFFERENTIAL

Application filed October 9, 1930. Serial No. 487,424.

The present invention pertains to a novel differential designed particularly for motor vehicles, although equally useful in other machines where two alined shafts or axles are to be driven.

The principal object of the invention is to provide greater freedom of the shafts, or wheels carried thereby, from each other, thereby reducing the amount of spinning of the shaft having less load and also reducing the wear of tires carried by the wheels. Another object is to provide a direct and invariable drive connection from the power shaft to the axles, whereby an equal and positive drive is applied to each shaft when the load is heavy, as in running over snow, ice, sand, rough ground and soft earth.

These objects are accomplished by the use of a slip or frictional connection between the main gear and the axles. The differential action for different loads on the axles is acquired through a slip in the frictional connections. For a heavy load on each axle, a gear shift is provided for connecting the axles directly and positively to the main gear.

The invention is fully disclosed by way of example in the following description and in the accompanying drawings in which Figure 1 is a plan section of the differential;

Figure 2 is a section on the line 2—2 of Figure 1;

Figure 3 is an enlarged detail view of the roller mounting;

Figure 4 is a detail section of the roller mounting; at right angle to Figure 3.

Figure 5 is a section on the line 5—5 of Figure 3;

Figure 6 is a section on the line 6—6 of Figure 1;

Figure 7 is a section parallel to the plane of Figure 1, partly in elevation and in disengaged position;

Figure 8 is a section on the line 8—8 of Figure 7;

Figure 9 is a section on the line 9—9 of Figure 7; also showing the operating levers; and Figure 10 is a section on the line 10—10 of Figure 9.

Reference to these views will now be made by use of like characters which are employed to designate corresponding parts throughout.

The mechanism is enclosed mainly in a housing 1 to which is secured the rear end of a drive shaft tube 2 by means of bolts 3. A drive or propeller shaft 4 passes through the tube 2 and carries a pinion 5 disposed within the housing 1.

Axle shafts 6 are journalled in roller bearings 7 in the housing 1. These shafts are in mutual alinement and perpendicular to the drive shaft 4 in order to carry the driving wheels of a motor vehicle in the usual manner.

The inner ends of the shafts 6 are toothed at 8 for driving engagement with friction disks 9 formed with sleeves 10 also internally toothed for locking engagement with the toothed portions 8. Between the disks 9 is inserted a driving friction disk 11 formed with an annular or crown gear 12 normally in mesh with the drive pinion 5.

The outer faces of the disks 9 are engaged by friction rings 13 formed with internal teeth 14. Headed bolts 15 pass through the members 11 and 13 and are surrounded at one end by compressed springs 16 whereby these parts are frictionally held together. The members 9 are free to rotate within a flange 17 on the plate 11 and are driven from the plate 11 by frictional contact therewith.

In order to provide a positive drive between the members 12 and shafts 6, sliding pinions 18 are splined or keyed at 19 on the sleeves 10 and adapted to mesh with teeth 14.

The gears 18 are provided with shifter half collars 20 from which stems 21 extend through the housing 1. Levers 22 are pivoted to the stems and also to the housing 1 at 23. Operating rods 24 extend from the levers 22 and are finally attached to operating levers 25 mounted within convenient reach of the driver. The levers have their handles 26 positioned close together but slightly spaced so that either one or both may be gripped with one hand, as desired.

A conical roller 27 is journalled in a notch 28 cut in the housing 1 as shown more clearly in Figures 3 and 4. This roller serves as a rest or bearing for the crown gear 12. Both ends of the roller are carried in bearings 29 adjustable with reference to the notch 28 by means of set screws 30 engaging the housing as may be seen in Figures 1, 3 and 5.

The free ends of the axle shafts 6 are also suitably journalled as shown in Figure 7. These ends ride on ball bearings 31 and roller bearings 32 held by a retaining sleeve 33 threaded into the housing 1 at 34. The sleeve is further secured by a set screw 35.

The inner end 36 of the drive shaft 4 is accommodated in roller bearings 37 which in turn are housed in a cage 38. The cage is received in a suitable cavity 39 formed in the member 2 and is adapted to slide horizontally therein as may be seen in Figure 6.

Under normal running conditions, a wedge 40 holds the cage against movement in its cavity and thereby centers the shaft 4 so that the drive pinion 5 meshes with the crown gear 12. When it is desired to disengage the members 5 and 12, the wedge is withdrawn after removal of its retaining screw 41, and the cage is moved horizontally by adjustment of the set screw 42 engaging it.

It will now be evident that the drive to the axles is normally transmitted through frictional connections whereby both axles turn at equal speeds. When one of the axles carries a greater load than the other, as in rounding a curve, the differential movement is taken up by a slip in the frictional connections. Nevertheless, both axles turn at all times so that complete idleness of one of the axles, as in other differentials under certain conditions, is avoided. This property of the invention results in equal power in the axles when travelling over soft ground, reduction of the danger of breaking the axles and gears by sudden shocks at the wheels, and reduction of wear on the tires. Repair and replacement of the differential parts are also facilitated.

When the load on the axles is unusually heavy, a direct drive is obtainable by engaging the pinions 18 with the gears 14 which in turn are positively secured to the main gear 12 by the bolts 15. This direct drive is particularly useful in travelling over hills, rough ground, carrying a heavy load, and in other cases where the strain on the axles is heavy.

Although a specific embodiment of the invention has been illustrated and described, it will be understood that various alterations in the details of construction may be made without departing from the scope of the invention as indicated by the appended claims.

What I claim is:—

1. A differential comprising a main gear having a frictional portion, axles at opposite sides of said portion, frictional driving members carried by said axles and engaging said portion, and spring means holding said members in engagement with said portion, auxiliary gears fixed to said main gear, pinions splined with respect to said axles, and means for moving said pinions into and out of engagement with said auxiliary gears.

2. A differential comprising a main gear having a frictional portion, axles at opposite sides of said portion, frictional driving members carried by said axles and engaging said portion, auxiliary gears mounted on said members, bolts passed through said gears and frictional portion, springs on said bolts tending to clamp said gears, driving members and frictional portion together, pinions splined with respect to said axles, and means for moving said pinions into and out of engagement with said auxiliary gears.

3. A differential comprising a main gear having a frictional portion, axles at opposite sides of said portion, frictional driving members carried by said axles and engaging said portion, auxiliary gears mounted on said members, bolts passed through said gears and frictional portion, springs on said bolts tending to clamp said gears, driving members and frictional portion together, pinions splined on said auxiliary gears, and means for moving said pinions into and out of engagement with said auxiliary gears.

4. A differential comprising a main gear having a frictional portion, axles at opposite sides of said portion, frictional driving members carried by said axles and engaging said portion, and spring means holding said members in engagement with said portion, a drive shaft having a pinion meshing with said main gear, a housing enclosing said shaft, a bearing cage slidably fitted in said housing and accommodating said shaft, and a removable key holding said cage against movement and said shaft in operative position relatively to said main gear.

5. A differential comprising a housing, a pair of spaced and alined axles journalled therein, frictional members carried by said axles, a main gear having a frictional portion disposed between said members, auxiliary gears mounted on said frictional members, bolts passed through said auxiliary gears and frictional members, springs on said bolts and clamping said gears and members against said frictional portion, pinions splined with respect to said axles, and means for moving said pinions into and out of engagement with said auxiliary gears.

6. A differential comprising a housing, a pair of spaced and alined axles journalled therein, frictional members carried by said axles, a main gear having a frictional portion disposed between said members, auxiliary gears mounted on said frictional members, bolts passed through said auxiliary gears and frictional members, springs on said bolts and clamping said gears and members against said frictional portion, pinions splined with respect to said axles, shifting collars rotatably mounted on said pinions, and linkage extending from said collars for moving said pinions into and out of engagement with said auxiliary gears.

In witness whereof, I have hereunto set my hand.

JOSEPH GUILMETTE.